P. HELM.
ROCK-DRILLING AND WELL-BORING APPARATUS.
No. 176,859.                          Patented May 2, 1876.
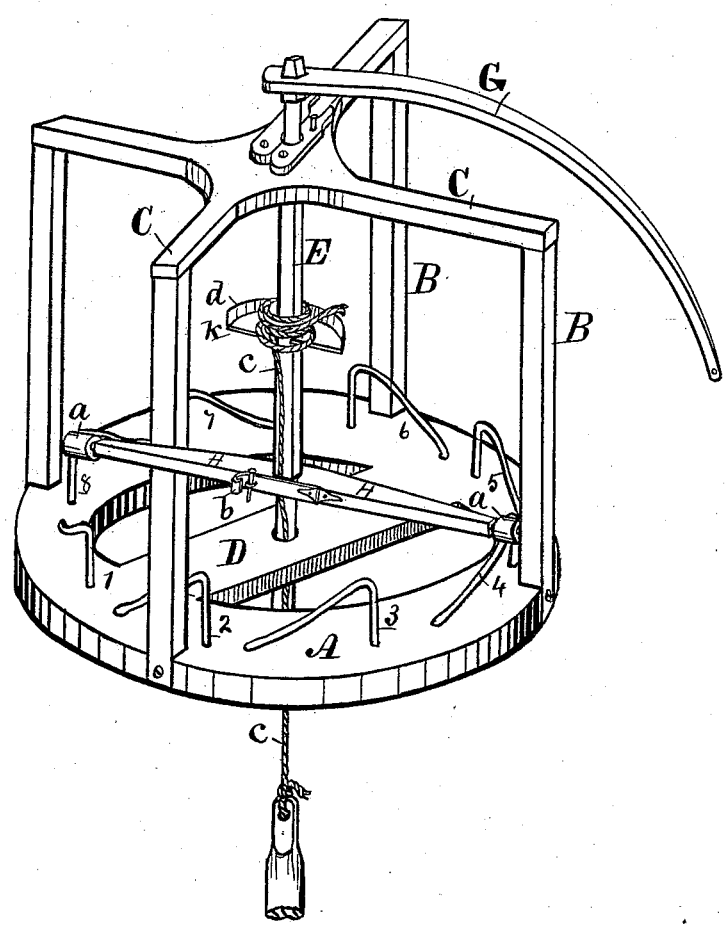

UNITED STATES PATENT OFFICE.

PHINEAS HELM, OF MONTOUR, IOWA.

IMPROVEMENT IN ROCK-DRILLING AND WELL-BORING APPARATUS.

Specification forming part of Letters Patent No. 176,859, dated May 2, 1876; application filed December 30, 1875.

*To all whom it may concern:*

Be it known that I, PHINEAS HELM, of Montour, in the county of Tama and State of Iowa, have invented a Rock-Drilling and Well-Boring Apparatus, of which the following is a specification:

The object of my invention is to furnish an apparatus that is equally well adapted for operating a rotary auger or a reciprocating drill, alternately, as is frequently required in boring for water and other mining operations.

It consists in forming, arranging, and combining permanently-fixed inclined planes on the base-plate of the derrick, and movable arms and a movable rope-shelf on the rotating vertical shaft, all as hereinafter fully set forth.

My drawing is a perspective, illustrating the construction and operation of my invention.

A represents the base of a derrick. It is preferably circular, but may vary in form, and may be made of wood or any suitable material, and vary in size, as desired. B B represent the uprights of the derrick-frame. C C are cross-pieces at the top of the derrick. The derrick-frame should correspond in size with the base A, and be rigidly joined thereto in any suitable way. D is a cross-plate extending across the open center of the base A, and rigidly attached thereto. E is a rotating central vertical shaft, that has its bearings in the cross-plate D and the top of the derrick C. G is a sweeping-beam, attached to the top of the shaft E. 1 2 3 4 5 represent a series of inclined planes, rigidly fixed, equidistant from each other, in a circular line upon the top of the base A, and inside of the posts B. These inclined planes may be formed of wood, wrought-iron, or cast metal, skeleton or solid, in any manner desired. H H is a movable bar fixed on the shaft E, forming two equal arms extending from the shaft to the series of inclined planes 1 2 3. *a a* are anti-friction rollers on the ends of the arms H, and designed to facilitate the motion of the arms as they bear upon and travel over the inclined planes. The section of the shaft E to which the arms H are attached is square or angular. A mortise of corresponding form in the longitudinal center of the bar H allows the shaft to enter the bar. *b* is a hinged hasp covering the mortise in the bar, and serves to lock and retain the bar rigid on the shaft, and also to clamp, hold, and adjust the rope or chain *c*, passing downward through a longitudinal groove in the shaft E. K is a semicircular movable shelf, having a vertical rim or flange, *d*, attached to the shaft E, above the arms H, to support the drill-rope *c*, and to prevent it from getting twisted and tangled during the operations of the rotating shaft E and the reciprocating drill L, represented at the bottom of the rope *c*.

To operate an auger with my apparatus, remove the arms H, the shelf K, and the rope *c*, carrying the drill L, and rigidly attach the auger, by means of suitable couplings and sections of shafting, to the bottom of the shaft E. A horse may then be hitched to the end of the beam G to rotate the shaft E and operate the auger, or any other motive power may be applied in any suitable way.

When the auger reaches a stratum of rock or other hard substance the auger can be removed, and the drill-rope, arms, and shelf replaced to drill through the rock. The rotating of the shaft E will cause the arms H to travel over the series of inclined planes 1 2 3, and successively rise and fall, and alternately lift and drop the combined shaft and rope, and thereby impart a reciprocating motion to the suspended drill, which will, by force of gravity, cut the rock and sink a bore through the rock.

An auger and a drill can be thus conveniently, alternately, and advantageously operated by the same power, in one and the same bore or well, without removing the derrick.

The complete apparatus can be moved about to be used exclusively for drilling, when so desired.

I am aware that a double series of inclined planes has been connected with a derrick to operate a drill by means of arms connected with a rotating shaft; but I claim that my manner of fixing a single series of inclined planes upon the base-plate of a derrick, and movable arms to an auger-shaft, to operate a drill attached at its bottom, is new and greatly advantageous in well-boring operations.

I claim as my invention—

1. In a well-auger derrick, the series of inclined planes 1 2 3 4 on the base-plate A, in combination with the movable arms H H, carried by the rotating auger-shaft E, to operate a drill when the auger is removed, substantially as shown and described.

2. The shelf K, in combination with the shaft E, substantially as and for the purposes shown and described.

3. The derrick A B C D, having a series of inclined planes, 1 2 3, in combination with the shaft E, carrying the arms H H, shelf K, rope c, and drill L, substantially as and for the purposes set forth.

PHINEAS HELM.

Witnesses:
A. J. DINGEE,
H. J. STEVENS.